United States Patent [19]
Kanamaru et al.

[11] 4,277,340
[45] Jul. 7, 1981

[54] MEMBRANE SEPARATION MODULE AND APPARATUS FOR ITS PRODUCTION

[75] Inventors: Naokatu Kanamaru, Kyoto; Kazuo Imai, Moriyama; Hisaaki Fujino, Hikone, all of Japan

[73] Assignee: Toray Industries, Inc., Japan

[21] Appl. No.: 932,399

[22] Filed: Aug. 9, 1978

Related U.S. Application Data

[62] Division of Ser. No. 815,284, Jul. 13, 1977, Pat. No. 4,137,113.

[30] Foreign Application Priority Data

Jul. 13, 1976 [JP] Japan .................................. 51-82486
Mar. 29, 1977 [JP] Japan .................................. 52-34930

[51] Int. Cl.³ ............................................. B01D 31/00
[52] U.S. Cl. .................................. 210/433.2; 156/187; 242/155 R; 210/494.1
[58] Field of Search .......................... 242/155 R, 172; 156/187; 210/494 M, 487, 433 M

[56] References Cited

U.S. PATENT DOCUMENTS

| 1,951,484 | 3/1934 | Lawes | 210/487 X |
| 3,890,182 | 6/1975 | Terry | 156/187 |
| 3,933,646 | 1/1976 | Kanamaru et al. | 210/321 R |
| 3,963,621 | 6/1976 | Newman | 210/494 M X |
| 4,062,710 | 12/1977 | Muckenheim | 156/187 |

Primary Examiner—Frank A. Spear, Jr.
Attorney, Agent, or Firm—Finnegan, Henderson, Farabow, Garrett & Dunner

[57] ABSTRACT

Disclosed is a liquid separation module of the spiral type which is produced by a simple apparatus requiring no manual operations, so that a mandrel is provided with a spirally and tightly wound layer arrangement consisting of a plurality of layer elements without any abnormal relative shifting between any layer elements, without the occurrence of wrinkles in any layer element and with uniform tightness of the winding along the radius of the wound layer arrangement. The layer arrangement is wound on the mandrel in such way that, while the layer arrangement is being wound on the mandrel by rotating the mandrel with the forward end of the layer arrangement fixed to the mandrel, a portion of the layer arrangement which has not yet been tightly wound is radially pressed just before coming into tight contact with the mandrel or with another portion of the layer arrangement which has been tightly wound, so that the degree of winding tightness is increased separated from each other. A preferable layer arrangement is prepared so that the layer elements are piled one on top of the other and a single sheet of permeable membrane is used as one of the layer elements, which is connected at the ends thereof to form a loop after completion of the winding process. Apparatus for producing such a liquid separation module is also disclosed.

11 Claims, 15 Drawing Figures

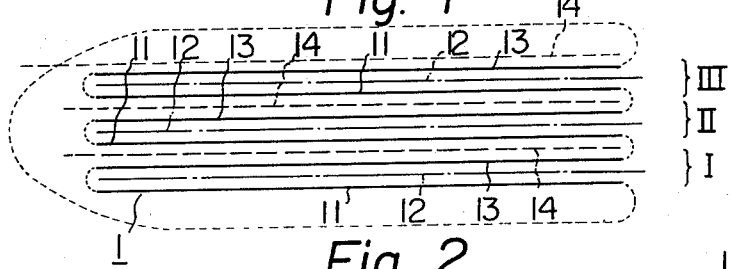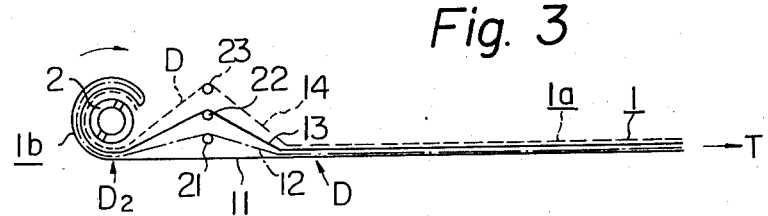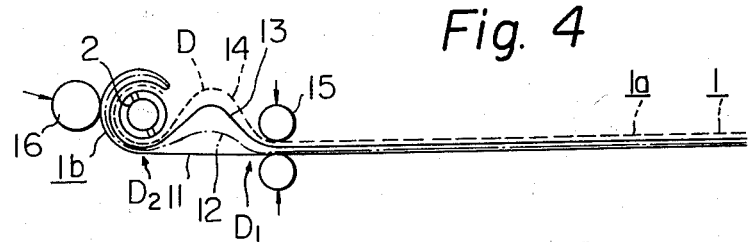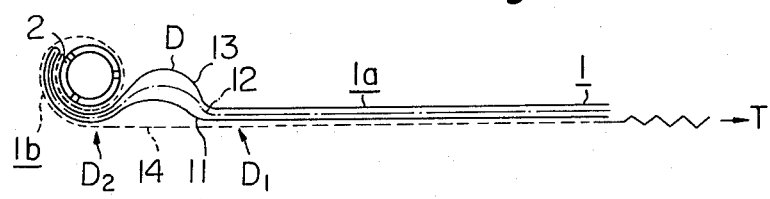

MEMBRANE SEPARATION MODULE AND APPARATUS FOR ITS PRODUCTION

This is a division of application Ser. No. 815,284, filed July 13, 1977, now U.S. Pat. No. 4,137,113.

BACKGROUND OF THE INVENTION

The present invention relates to a liquid separation module of a spiral type employing semipermeable membrane sheets for separating a desired liquid component from a feed solution, and utilizing the principle of reverse osmosis or ultra-filtering and apparatus for producing such a module.

A liquid separation module is of complicated construction. Normally, at least two semipermeable membrane sheets, as well as one kind of spacing layer for a first passage for a permeated solution and another kind of spacing layer for a second passage for a feed solution are spirally wound about a hollow mandrel having at least one hole. The first passage is formed between the inside surfaces of the two membrane sheets and communicates with the interior of the hollow mandrel through the hole, and the second passage is formed between the outside surfaces of the two membrane sheets.

The specifications of U.S. Pat. No. 3,386,583, U.S. Pat. No. 3,397,790, and O.S.W. Reports No. 879 and No. 341 (Office of Saline Water) or PB-228061 and PB-204107 disclose methods of producing liquid separation modules having a construction such as mentioned above. Each of these disclosed methods requires an apparatus of large dimensions and of very complicated construction, having a mechanism designed so that all of the layer elements to be wound are radially or tangentially tensioned separately and the tensioned layer elements are wound around a stationary hollow mandrel.

Generally speaking, to wind a plurality of layer elements, such as those of a liquid separation module, about a mandrel, it would be convenient to adopt a method wherein the layer elements, arranged one on top of the other, are spirally wound about a mandrel by rotating the mandrel with the forward end of the layer arrangement fixed thereto, while the layer arrangement as a whole is tensioned. However, with this method, the differences in curvatures of neighboring inner and outer layer elements in the layer arrangement wound about the mandrel cause a difference in the winding velocities of the layer elements. This results in the inner layer elements shifting rearwardly relative to the outer layer elements. Such shifting movement would occur smoothly and the inner layer elements would be shifted by an easily predetermined amount relative to the outer layer elements, if the layer arrangement were loosely wound and the neighboring layer elements were smoothly slidable on each other. However, the layer elements employed in a liquid separation module, that is, membrane sheets and spacing layers, are not smoothly slidable on each other. A liquid separation module is required to have tightly wound layer elements. One deterrent to smooth sliding within the layer arrangement employed in liquid separation modules is that the arrangement has wrinkles caused by the layer arrangement having a nonuniform thickness. This nonuniform thickness of the arrangement is due to the factors noted below.

A. In general, it is difficult to produce layer elements, particularly spacing layers, of uniform thickness.

B. Piling different kinds of layer elements one on top of the other, each having a nonuniform thickness, enhances the nonuniform thickness of the layer arrangement.

C. Each membrane sheet has adhesive material layers at its edge portions so that it can be bonded to the neighboring membrane sheet with a spacing layer disposed between the two membrane sheets after they are wound together. This adhesive layer results in enhancing the nonuniform thickness of the layer arrangement, caused by the problem mentioned in A above, if the membrane sheet is not placed accurately on the spacing layer at a predetermined relative position with the result that the adhesive layer abuts the edge portion of the spacing layer. However, in practice, it is difficult to place the membrane sheet on the spacing layer at the predetermined relative position.

Consequently, if the above-mentioned seemingly convenient method were to be adopted for producing a liquid separation module under the condition that the layer arrangement is wound tightly about a mandrel, the inner layer element would shift rearwardly relative to the outer layer element by an amount less than the before-mentioned predetermined amount, which would cause the occurrence of many wrinkles along its length and in the other layer elements. The wrinkles in the layer elements, particularly in the membrane sheets, damage the permeating function of the sheet, with the result that the performance of the liquid separation module is reduced.

Further, if the above-mentioned seemingly convenient method were applied for making a liquid separation module, the wound layer arrangement would not only have the above disadvantages but also the following disadvantage. In general, the inner portion of such a spirally wound layer arrangement tends to be loosely compared with the outer portion thereof. However, in a liquid separation module utilizing the principle of reverse osmosis, such a nonuniform tightness results in an unequally distributed fluid flow in the permeated solution passage and feed solution passage. This, in turn, produces the phenomenon of polarized concentration, which decreases rejection, i.e. the performance of the module, and further, leads to such deformation of the wound layer arrangement as telescoping.

Conventional methods employ a mechanism for separating portions of layer elements which have not yet been wound from each other the length thereof, and for tensioning the layer elements separately while they are being wound. This prevents damage to the wound layer elements by such abnormal relative shifting with wrinkles, as mentioned above, and permits uniform tightness of winding along the radius of the spirally wound layer arrangement to be obtained. However, an apparatus provided with such a separating and tensioning mechanism requires not only a complicated construction but also troublesome manual operations, by which all of the layer elements are individually mounted to the apparatus. Further, it requires delicate tension control for tensioning the separate layer elements to thereby ensure uniform tightness to a predetermined degree. In addition, in conventional apparatus, wherein the layer elements are being tensioned separately and wound, if the adhesive material were coated on the entire edge portions of the membrane sheets to bind the neighboring membrane sheets, it would have a tendency to flow away from and/or along the edge portions thereof.

Therefore, in practice, such adhesive material is, for example, coated on parts of the edge portions just before said parts reach the mandrel. However, such a partial coating operation is very troublesome.

SUMMARY OF THE INVENTION

An object of the present invention is to provide apparatus for producing a liquid separation module of high quality by utilizing a simple apparatus wherein layer elements which are piled one on top of the other are tightly wound by a mandrel without any abnormal shifting, e.g., by sliding, of the layer elements relative to each other and without any occurrence of wrinkles of the layer elements and wherein the tightness of winding is uniform along the radius of the wound layer arrangement.

The present invention is directed to production of a liquid separation module of a spiral type, for use in a semipermeable membrane separation apparatus, comprising a hollow mandrel having at least one hole on the outer circumference thereof and a sheet layer arrangement which is wound spirally about the mandrel. The layer arrangement comprises, in a cross-sectional view, a pair of semipermeable membrane sheets, and one kind of spacing layer for a first passage for a permeated solution and another kind of spacing layer for a second passage for a feed solution. One of the spacing layers is disposed between the membrane sheets, and the other spacing layer is disposed on the outer surface of one of the membrane sheets. When the layer arrangement is completely wound on the mandrel, the first passage is closed at the rear end of the wound layer arrangement over the entire length thereof along the axis of the mandrel and at the opposite edges of said wound layer arrangement over the spiral length thereof, and; the first passage is open at the forward end of the wound layer arrangement over the entire length thereof along the axis of the mandrel to communicate with the interior of the mandrel through the hole in the mandrel.

The invention is directed to an improvement in a spiral-type liquid separation module for use in semipermeable membrane separation apparatus, comprising a hollow mandrel having at least one hole in its outer circumference, and a sheet layer arrangement which, viewed in transverse cross section, comprises a plurality of pairs of semipermeable membrane sheets and a plurality of first and second spacing layers forming first passages for carrying a permeated solution and second passages for carrying a feed solution, said first spacing layers being disposed between said membrane sheets and said second spacing layers being disposed between the outer surfaces of said respective membrane sheets, wherein said layer arrangement is spirally and tightly wound about said mandrel to form said first and second passages in spiral form, said first passages being closed at their respective radially outermost ends and open at their respective radially innermost ends to communicate with the interior of said mandrel through said hole, and said second passages being closed at their respective radially innermost ends and open at their respective radially outermost ends, the improvement being characterized in that a single semipermeable membrane sheet having a plurality of folds extending parallel and adjacent to the axis of said mandrel is provided, wherein each of said folds forms one of said pairs of membrane sheets, and wherein the axially extending ends of said single membrane sheet are joined to form said sheet into a continuous loop, when viewed in transverse section, with said second spacing layers being located outside the loop and said first spacing layers and said mandrel being located inside the loop.

The invention is further directed to apparatus for producing a liquid separation module, said module having a hollow mandrel with at least one hole extending through the circumference thereof for permitting passage of permeated solution therethrough, and a spirally wound layer arrangement which, viewed in transverse cross section, comprises a plurality of semipermeable, separatory membrane sheets and spacing layers therebetween, at least one of the spacing layers having its inner end secured to said mandrel, comprising said mandrel, means for rotating said mandrel for loosely winding said layer arrangement on said mandrel, and roller means for radially pressing said loosely wound layer arrangement at least at one position on the circumference of said loosely wound layer arrangement over the entire width of said loosely wound layer arrangement for increasing the degree of winding tightness of said wound layer arrangement.

A basic feature of the present invention resides in the fact that, while the layer arrangement is being spirally and tightly wound about the mandrel by rotating the mandrel with the forward end of the layer arrangement fixed to the mandrel, a portion of the layer arrangement which has not yet been tightly wound is forced to bulge in a direction perpendicular to the surface of the layer arrangement, just before coming into tight contact with the mandrel or with another portion of the layer arrangement which has been tightly wound. Consequently, at the bulged portion the layer elements of the layer arrangement are partially separated from each other.

In one embodiment of the above basic feature, the layer arrangement is prepared so that its layer elements are piled one on top of the other and at the next stage it is tightly wound about the mandrel. The winding is carried out in such way that, while the layer arrangement is being spirally and tightly wound about the mandrel by rotating the mandrel with the forward end of the layer arrangement fixed to the mandrel, a portion of the layer arrangement which has not yet been wound is forced to bulge in a direction perpendicular to the surface of the layer arrangement, just before reaching the mandrel, that is, before coming into tight contact with the mandrel or with another portion of the layer arrangement which has been tightly wound. As a result, at the bulged portion, the layer elements of the layer arrangement are partially separated from each other.

In another embodiment of the above-mentioned basic feature, at a first stage, a layer arrangement is spirally and loosely wound about the mandrel, and at a second stage, the loosely wound layer arrangement is tightly wound. The tight winding is carried out in such a way that, while the mandrel is being rotated with the forward end of the layer arrangement fixed to the mandrel, a portion of the layer arrangement which has been loosely wound, but not yet tightly wound, is forced to bulge outwardly radially, just before coming into tight contact with the mandrel or another portion of the layer arrangement which has been tightly wound. As a result, at the bulged portion the layer elements of the layer arrangement are partially separated from each other. In this case, the layer arrangement may be prepared for the first stage winding process in such a way that the layer elements are piled one on top of the other. Further, at the first stage the layer arrangement may be spirally but loosely wound about the mandrel in such a way that, while the mandrel is being rotated with the forward end of the layer arrangement fixed to the mandrel, a portion of the layer arrangement which has not yet been wound is forced to bulge in a direction perpendicular to the surface of the layer arrangement just before coming into loose contact with the mandrel or with another portion of the layer arrangement which has been loosely wound, so that at the bulged portion the layer elements of the layer arrangement are partially separated from each other.

In the above-mentioned processes, the layer arrangement may be prepared in such a way that it forms a united layer arrangement which, in a cross-sectional view, consists of a plurality of individual sheet layer arrangements piled one on top of the other. Each individual sheet layer arrangement, in a cross-sectional view, consists of a first membrane sheet, a first spacing layer for a first passage of a permeated solution, a second membrane sheet and a second spacing layer for a second passage of a feed solution piled one on top of the other in the order as mentioned. The first membrane sheet in each individual sheet layer arrangement is disposed on the outer surface of the second spacing layer in the neighboring individual sheet layer arrangement.

One sheet of semipermeable membrane may be used in each individual sheet layer arrangement to form the first and second membrane sheets. That is, the single sheet is folded over itself at the end of each individual sheet layer arrangement. Further, a single sheet of semipermeable membrane may be used in the united sheet layer arrangement to form all of the first and second membrane sheets in the individual sheet layer arrangements. In this case the single semipermeable membrane sheet forms each first and second membrane sheet in each individual sheet layer as mentioned above and is also folded over itself at the ends of the first membrane sheet and the second membrane sheet in the neighboring individual sheet layer arrangements.

Naturally, separate semipermeable membrane sheets may also be used in each individual sheet layer arrangement to form the first and second membrane sheets, respectively.

In the present invention, the above-mentioned bulged portion of the layer arrangement shifts from the forward end of the layer arrangement fixed to the mandrel toward the rear end thereof, while the mandrel is rotated. While the bulged portion is shifting, separation of each pair of neighboring inner and outer layer elements begins at the rear end of the bulged portion, which is referred to as a "separating point", and contact of the neighboring layer elements begins at the forward end of the bulged portion, which is referred to as a "contacting point". In this case, a portion A of the inner layer element which has passed over the separating point proceeds toward the contacting point along a curved path. Naturally, the distance traveled by the portion A is longer than that traveled by a portion B of the outer layer element which has passed over the separating point at the same time as portion A, and proceeds toward the contacting point along a flat path. Thus, the linear movement of portion A is retarded compared with the portion B, so that the winding velocity of portion A at the contacting point coincides with the required winding velocity, which is determined by the rotational speed of the mandrel and the radius of curvature of portion A at the contacting point in normal winding. Thus, although portions A and B pass over the separating point together with the same winding velocities, portion A is shifted rearwardly relative to portion B by a length which allows portion B to be wound with the inner layer element without the occurrence of wrinkles. It is important to note, however, that the relative shifting movement of the inner layer element occurs only at the bulged portion and in this movement the shifting portion of the inner layer element does not slide against the surface of the outer layer element.

Briefly stated, the bulged portion provided by the present invention functions as a means for compensating for the difference in the radiuses of curvature of the neighboring layer elements, or the difference in the winding velocities of both layer elements, so that each layer element of the layer arrangement is wound smoothly without any abnormal relative shifting of the layer elements or the occurrence of any wrinkles in the layer elements.

In general, when piled sheets are wound, a bulging phenomenon such as mentioned above may sometimes occur naturally. However, the natural bulging phenomenon is unstable. That is, there is no way to assure that the bulged portion of the piled sheets will shift smoothly over the length of the sheets or that the sheets will be completely separated from each other. Therefore, means for keeping the bulging phenomenon stable is definitely required, when such phenomenon is utilized in making a liquid separation modules. In general, it is difficult to keep two sheets partially separated over their widths and to shift the partially separated portion along the length of the sheets. Such difficulty is increased if the sheets are very wide compared with their thickness, as is the case with layer elements employed in a liquid separation module, wherein at least one of the sheets, that is, the permeable membrane sheet, is very thin.

According to the present invention, separating bars having axes parallel to the axis of the mandrel are preferably used in such a manner that one bar is interposed between neighboring layer elements just before the elements come into contact with the mandrel or with a portion of the layer arrangement which has been wound. All of the bars are kept at positions spaced apart from each other in a direction perpendicular to the surfaces of the layer elements. As a result, the layer arrangement is caused to bulge, so that at the bulged portion, the layer elements are partially separated from each other. This causes the length of the bulged portion, from the separating point to the contacting point, to be increased as the portion of the layer arrangement which has been wound increases. To keep the length of the bulged portion constant. the space between each pair of neighboring bars must be increased as the wound portion of the layer arrangement increases.

The above-described method of bulging the layer arrangement, so that the layer elements are partially separated from each other, requires a simple apparatus equipped with separating bars. However, there is another preferable method of bulging the layer arrangement, so that the layer elements are partially separated from each other, which utilizes the stiffness of each layer element. This method has the advantage that it does not require any apparatus, but it does require that each layer element have a certain degree of stiffness. However, even if the degree of stiffness of each layer element is relatively low, it is possible to assist in bulging the layer element by positively preventing the layer element from sliding against the neighboring layer element along the surfaces thereof. In this regard, enhancing the frictional resistance of the surface of each layer element is effective for preventing sliding of the layer elements. For example, in a case where a tricot layer is employed as a spacing layer for the passage for a feed solution, it is preferable to treat the surfaces of the layer with a resin material to thereby enhance the frictional resistance thereof. Further, a pressure applied perpendicular to the surface by a pair of rollers between which the layer arrangement passes effectively prevents sliding of the neighboring layer elements against each other. According to this method, the bulged portion of the layer arrangement appears between the mandrel and the pair of rollers. Increasing the moisture which is imparted to the layer arrangement is also effective for enhancing the frictional resistance of the surface of each layer element. Further, coating the edge portions of the membrane sheets required to be bonded together with an adhesive material before winding is effective for enhancing frictional resistance. Preparing the layer arrangement so that it is curved in a direction opposite to the winding direction is also effective for promoting the partial separation of the layer elements. Such a curve in the layer arrangement could, for example, be produced by initially winding the layer arrangement on a mandrel in a direction opposite to that in which it will be wound in when the liquid separation module is produced.

When the loosely wound layer arrangement is tightly wound at the second stage, as previously mentioned, it is preferable to use at least one roller having an axis parallel to the axis of the mandrel, in such a manner that the roller is pressed radially against the loosely wound layer arrangement. This causes bulging of a portion of the layer arrangement which has not been tightly wound, so that at the bulged portion, the layer elements of the layer arrangement are partially separated from each other. While the loosely wound layer arrangement is being rotated together with the mandrel, a tightly wound portion of the layer arrangement is enlarged from the forward end thereof fixed to the mandrel, toward the rear end thereof. It is important for the roller to be rotated smoothly according to the rotational movement of the layer arrangement. Otherwise, the rear portion of the layer arrangement will be more tightly wound than the forward portion thereof. The roller should be partially pressed against the loosely wound layer arrangement over the entire width thereof.

In order to prevent the mandrel from being bent, two or more rollers spaced apart from each other around the circumference of the loosely wound layer arrangement, preferably three or four rollers, should be provided to press the layer arrangement at separate points on the circumference of the layer arrangement. In this case, the portion of the layer arrangement which has not been tightly wound is forced to bulge at zones between each of the neighboring rollers. At each bulged portion, the layer elements are partially separated from each other, so that any abnormal relative shifting or occurrence of wrinkles in the layer elements is prevented, as in the previously described case where a layer arrangement is tightly wound at a single stage.

At the first stage when the layer arrangement is loosely wound about the mandrel, the layer arrangement may be wound by the mandrel while it is subjected to a relatively low tension or no tension. In the case of a tensioned layer arrangement, the layer arrangement should be tensioned to such an extent that no wrinkles are forced to occur while the mandrel is rotated.

According to the present invention, membrane sheets made of a polymer of cellulose acetate, cellulose triacetate, polyamide, or the like, all of which are, in general, used as reverse osmosis membranes or ultra filtration membranes, may be employed as semipermeable membrane sheets. In this case, it is preferable to combine a semipermeable membrane sheet with a stiff layer as a reinforcing material, to thereby enhance the stiffness of the combined sheet. A fabric of polyester which is referred to as a "taffeta" may employed as the reinforcing material. A preferable semipermeable membrane is a homogeneous membrane which is selected from the group consisting of cellulose diacetate, cellulose triacetate and a mixture of the two cellulose derivatives. Another preferable semipermeable membrane is an unsymmetric membrane selected from the group consisting of cellulose derivatives, aromatic polyamide and sulfonated polysulfone. Still another preferable semipermeable membrane is a composite membrane selected from the group consisting of polyurea derived from polyethylene imine with tolylenediisocyanate on polysulfone and polyamide derived from polyethyleneimine with isophthaloyl chloride on polysulfone.

As for the spacing layer for the passage for the feed solution, a thin sheet of a porous material, particularly one of a plastic cubic cross net, may be employed. The sheet of cubic cross net is preferable, since it has a low fluid resistance. It is not always necessary for the entire surface of the membrane sheet to be covered with the spacing layer for the feed solution passage.

As to the other spacing layer, for the passage for the permeated solution, a thin sheet of a porous material also may be employed. However, in this case, the material should be strong enough to resist radial external force when it is incorporated in a liquid separation module. For example, a thin sheet of tricot made of polyester with a resin treatment may be employed.

In a liquid separation module, a hollow mandrel is provided with a hole or a plurality of holes at the outer circumference thereof which communicate with the interior of the mandrel. The mandrel may be made of a hard plastic material such as PVC, ABS or the like, or a metallic material such as stainless steel.

An adhesive material for membrane sealing is employed to prevent the feed solution from flowing into the permeated solution which has been permeated through the membrane sheet. This adhesive material is applied to bind the pair, or pairs, of membrane sheets so that the sheets form an envelope containing a spacing layer for the permeated solution passage. For this purpose, an adhesive material of epoxy resin or urethane resin may be employed. However, selection of an adhesive material should be made after considering the following. An adhesive material with a high viscosity is more effective for preventing the afore-mentioned sliding of the layer element and, also, provides good resistance against the separation of neighboring layer elements from each other. Therefore, an adhesive material with an appropriate viscosity should be adopted, with consideration given to the stiffness of the employed layer element.

A liquid separation module according to the present invention requires a first spacing layer for a permeated solution passage and a second spacing layer for a feed solution passage, which are separated from each other by means of a membrane sheet. The module also requires first and second membrane sheets, which form first and second envelopes when they are wound about a mandrel, the first envelope being open at the forward end facing the mandrel and the second envelope being open at the rear end. The first envelope contains the first spacing layer and the second envelope contains the second spacing layer. The first membrane sheet, the first spacing layer, the second membrane sheet and the second spacing layer, in sequence, are piled on top of one another to form a layer arrangement before they are wound about the mandrel. In this case, so long as the above mentioned sequence is maintained, the lowermost layer element in the layer arrangement may be any one of the four kinds of layer elements.

In general, the first and second membrane sheets are made of the same materials, but they may, of course, be made of different materials. Further, in the case where a membrane sheet combined with a reinforcing material is employed, and the reinforcing material functions as either the first or second spacing layer, the corresponding spacing layer may be omitted.

A layer arrangement to be wound may be a united sheet layer arrangement which, in a cross-sectional view, consists of one or a plurality of individual sheet layer arrangements. Each individual sheet layer consists of, in a cross-sectional view, a first membrane sheet, a first spacing layer for the permeated solution passage, a second membrane sheet and a second spacing layer for the feed solution passage, in sequence, as mentioned before.

According to the present invention, a liquid separation module may employ a single sheet of semipermeable membrane forming the first membrane sheet and the second membrane sheet connected at the ends thereof in the individual sheet layer arrangement. Such a sheet of semipermeable membrane forming the first and second membrane sheets as above, which is hereinafter referred to as a continuous membrane sheet, is employed in a liquid separation module disclosed in the specification of U.S. Pat. No. 3,386,583. However, in this prior art structure the module has the disadvantage that an apparatus of complicated construction is required to produce it and a plurality of first spacing layers or second spacing layers are required to be formed by a single sheet of a continuous spacing layer. Further, a loop of the single membrane sheet having its ends connected is required to produce a wound layer arrangement. Therefore, according to this prior art, a layer arrangement to be wound is required to have, in a cross-sectional view, a first membrane sheet, a second spacing layer, a second spacing layer, a second membrane sheet, a first spacing layer and a first spacing layer in sequence; or a first membrane sheet, a first spacing layer, a first spacing, a second membrane sheet, a second spacing layer, and a second spacing layer in sequence. This means that this prior art structure requires more spacing layers than the present invention, with the result that the production cost of a module is increased and the proportion of the spirally wound layer arrangement occupied by the membrane sheet is reduced, compared with that of the present invention. The reduced proportional amount of the membrane sheet results in a decrease in the performance of the module.

Of course, according to the present invention, a layer arrangement having many spacing layers, such as in the prior art, may be employed. However, it is important to note that a layer arrangement having an individual sheet layer arrangement consisting of, in a cross-sectional view, first and second membrane sheets and first and second spacing layers for the permeated solution passage and the feed solution passage in such an arrangement that a sheet of the permeable membrane forms the two membrane sheets connected at the ends thereof, would have great advantages if it were employed in a liquid separation module.

According to the present invention, the above-described advantageous layer arrangement can be easily employed to produce a liquid separation module. A feature of the present invention resides in the fact that a united layer arrangement employing a continuous sheet of permeable membrane forming the first and second membrane sheets in each individual sheet layer arrangement can be preferably employed to produce a liquid separation module.

After the above-described advantageous layer arrangement is wound about the mandrel, each pair of first and second membrane sheets, between which each first spacing layer for the permeated solution passage is disposed, are bonded by an adhesive material at their opposite side edge portions along their length to form an envelope. Contrary to this, is separate sheets of permeable membrane are employed to form individual first and second membrane sheets, a process for cutting a long sheet of permeable membrane into individual sheets is required before preparation of a layer arrangement to be wound. Further, in this case, the troublesome operation of bonding each pair of first and second membrane sheets at the ends along the width thereof to form the envelope is additionally required. An increase in the portion of each membrane sheet which is bonded by the adhesive material leads to an increase in the amount, and therefore in the cost, of the adhesive material used, and results in a decrease in the area of the membrane sheet which exerts a permeating function. In addition, an increase in the portion bonded increases the possibility of a leak of fluid through the bonded portion of the envelope.

Preferred embodiments of the present invention will now be described with reference to the attached drawings in which:

BRIEF DESCRIPTION OF THE DRAWINGS

FIGS. 1 and 2 are diagrammatic views showing two embodiments of layer arrangements, particularly sequences of the piled layer elements, according to the present invention;

FIGS. 3, 4 and 5 are diagrammatic views showing three embodiments of a first process of bulging a layer arrangement according to the present invention, while the layer arrangement is wound by a mandrel;

DESCRIPTION OF THE PREFERRED EMBODIMENT

Figure 6:
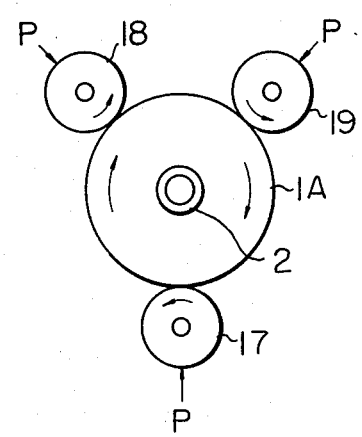
FIG. 6 is a diagrammatic view showing an embodiment of a second process of bulging a loosely wound layer arrangement according to the present invention while the layer arrangement is rotated by a mandrel.

FIG. 1 shows an embodiment of a layer arrangement to be wound about a mandrel by a method of the present invention. Referring to FIG. 1, three individual layer arrangements I, II and III are piled one on top of the other, in that order, to form a united layer arrangement. Each individual layer arrangement is formed by separated layer elements which comprise a membrane sheet 11, a spacing layer 12 for a feed solution passage 14, another membrane sheet 13 and another spacing layer 14 for a permeated solution in that order. The membrane sheet 11 in the upper individual layer arrangement is disposed on the outer surface of the spacing layer 14 in the neighboring lower individual layer arrangement. After the united layer arrangement is spirally wound about a mandrel, the two membrane sheets 11 and 13, between which each spacing layer 12 for the feed solution passage is disposed, are bonded with an adhesive material at the forward ends of the sheets facing the mandrel, over the entire width thereof, as shown by the dotted lines. The two membrane sheets 11 and 13, between which each spacing layer 14 for the permeated solution passage is disposed, are also bonded with an adhesive material at the rear ends of the sheets over the entire width thereof, as shown by the dotted lines. The membrane sheet 13 in the individual layer arrangement III and the membrane sheet 11 in the individual layer arrangement I are bonded at the rear ends of the sheets over the entire width thereof as shown by the dotted line. As a result, all of the separate membrane sheets are connected to form a loop of membrane sheet. All of the spacing layers 12 for the feed solution passage, are located outside of the loop, while all of the spacing layers 14 for the permeated solution passages are located inside of the loop. The neighboring membrane sheets 11 and 13, between which each spacing layer 14 for the permeated solution passage is disposed, are then bonded with an adhesive material at the opposite side edge portions over the entire spiral length to form an envelope opening at the forward end and containing the spacing layer 14.

Instead of connecting the membrane sheets by adhesive material, they may be connected to each other in such a way that the ends of the neighboring membrane sheets are overlapped and the membrane sheets are folded at the overlapped portion. However, if adhesive material is used, it is preferably coated on the necessary portions of the membrane sheets when the layer arrangement is prepared.

FIG. 2 shows another embodiment of a layer arrangement, in which only a single sheet of permeable membrane is employed. Referring to FIG. 2, three individual layer arrangements III, II and I are piled one on top of the other, in that order, to form a united layer arrangement. Each individual layer arrangement is formed by a spacing layer 14 for the permeated solution passage, a portion 13 of a membrane sheet 10, another spacing layer 12 for the feed solution passage and another portion 11 of the membrane sheet 10, in that order. The two portions 11 and 13 of the membrane sheet 10 between which each spacing layer 12 for the feed solution passage is disposed are connected at the forward ends. The two portions 11 and 13 of the membrane sheet 10 between which each spacing layer 14 for the permeated solution passage is disposed, are connected at the rear ends. After the united layer arrangement is spirally wound about a mandrel, the portion 11 in the individual layer arrangement III and the portion 13 in the individual layer arrangement I are connected at the rear ends to form a loop of the membrane sheet 1. All of the spacing layers 12 for the feed solution passage are located outside of the loop, while all of the spacing layers 14 for the permeated solution passage are located inside of the loop.

Comparing the first embodiment, shown in FIG. 1, with the second embodiment, shown in FIG. 2, the second embodiment has the following advantages. That is, a process of cutting a sheet of membrane into separated membrane sheets for preparation of a layer arrangement is omitted, and the portions of membrane sheet which are to be bonded are reduced, with the result that the labor for binding the necessary portions of the membrane sheet by an adhesive material and the amount of adhesive material used are reduced.

According to the present invention, a single layer arrangement consisting of two membrane sheets 11 and 13 and two spacing layers 12 and 14 in such an arrangement as in the individual layer arrangement shown in FIG. 1 or FIG. 2, or a united layer arrangement, consisting of a plurality of individual layer arrangements, as shown in FIG. 1 or FIG. 2, may be employed to produce a liquid separation module of a spiral type. When a layer arrangement is wound about a mandrel, opposite corners of the forward end of a spacing layer 14 for the permeated solution passage are fixed to the mandrel.

In FIGS. 1 and 2, the spacing layers 14 which are extended forwardly indicate those which are to be fixed to the respective mandrels.

FIGS. 3, 4 and 5 show embodiments of a first process of bulging a layer arrangement. In each embodiment, a single layer arrangement is employed for convenience of explanation of the process.

Referring to FIG. 3, a layer arrangement 1 corresponds to the individual layer arrangement shown in FIG. 1 and consists of (in a cross-sectional view), a membrane sheet 11, a spacing layer 12 for the feed solution passage, a membrane sheet 13 and a spacing layer 14 for the permeated solution passage, in that order. The corners of the forward end of the spacing layer 14 for the permeated solution passage are fixed to a hollow mandrel 2. Separating bars 21, 22, 23 are interposed between neighboring elements over the width thereof, respectively. That is, the first bar 21 is between the membrane sheet 11 and the spacing layer 12, the second bar 22 is between the spacing layer 12 and the membrane sheet 13, and the third bar 23 is between the membrane sheet 13 and the spacing layer 14. The three bars are arranged so that they are parallel to the axis of the mandrel 2 and are vertically spaced apart from each other in the vicinity of the mandrel. The bars may be fixed at appropriate separated positions. Alternatively, the bar may be shifted vertically while the winding process is carried out, as the portion of the layer arrangement which has been wound increases. With this arrangement, the mandrel 2 is rotated so that the layer arrangement 1 is tightly wound around the mandrel in a spiral form. In this case, the layer arrangement may be subjected to tension according to necessity. That is, if the tension is increased, the degree of tightness of the winding is increased. Preferably the tension is applied to the layer element which is fixed at the forward end thereof to the mandrel or to the outer layer element, that is the membrane sheet 11. If it is necessary for all of the layer elements to be subjected to tension, it is preferable to press a portion of the layer arrangement which has been wound by a roller 16 as shown in FIG. 4.

In a second embodiment, shown in FIG. 4, a layer arrangement 1 of the same kind as that of the first embodiment is partially pressed in a direction perpendicular to the surface of the layer arrangement, over the width thereof in vicinity of a mandrel 2, by a pair of rollers 15, while the mandrel 2 is rotated with the forward end of a spacing layer 14 fixed at the corners thereof to the mandrel and the layer arrangement passes between the rollers 15. A portion of the layer arrangement which has been tightly wound about the mandrel is preferably pressed radially over the width thereof by a roller 16 having an axis which is parallel to the axis of the mandrel, so that the layer arrangement is subjected to tension. Due to this tension the layer arrangement is tightly wound.

In a third embodiment, shown in FIG. 5, a layer arrangement 1 corresponding to the individual layer arrangement shown in FIG. 2 is used. The forward end of a spacing layer 14 in the layer arrangement is fixed at its corners to a mandrel 1 and this layer element 14 is subjected to tension by applying an external force to the rear end of the layer element 14. With this arrangement, the mandrel 2 is rotated so that the layer arrangement is tightly wound about the mandrel in a spiral form.

In the three embodiments shown in FIGS. 3, 4 and 5, while the layer arrangement 1 is being tightly wound by the mandrel, a portion of the layer arrangement which has not yet been wound, 1a, is forced to bulge toward a direction perpendicular to the surface of the layer arrangement, that is, upwardly as shown in the drawings, just before coming into tight contact with the mandrel 2 or another portion of the layer arrangement which has been wound, 1b, so that the layer elements are partially separated from each other as shown in the drawings at the bulged portion D. The bulged portion D shifts from the forward end to the rear end of the layer arrangement, while the mandrel is rotated and the layer arrangement is wound on the mandrel. While the bulged portion is shifting, separation of each of the neighboring inner and outer layer elements begins at the rear end of the bulged portion, that is at a separating point $D_1$. Contact of the neighboring layer elements begins at the forward end of the bulged portion, that is, at a contacting point $D_2$.

Portions (which are referred to as A and B hereinafter) of the inner and outer layer elements, respectively, which have passed over the separating point D, at the same time proceed along separated paths toward the contacting point $D_2$. That is, for example, the portion A follows the curved path of the bulge while the portion B follows a straight flat path. As a result, the portion A is retarded compared with the portion B so that the winding velocity of the portion A at the contacting point $D_2$ coincides with the velocity required in a normal winding process, or in other words, the portion A is shifted rearwardly relative to the portion B by a difference in length between the inner and outer layer elements required in the normal winding process. Such retardation or relative shifting of the inner layer element occurs without any contact with the outer layer element, and does not influence the portion of any layer element which has not reached the separating point $D_1$. Therefore, all of the layer elements are wound tightly without any abnormal relative shifting and without occurrence of any wrinkles thereon. Further, every portion of the layer arrangement is ensured to be wound in substantially the same tightness.

The bulging process shown in FIG. 5 has an advantage in that it is very simple, compared with the other process shown in FIGS. 3 and 4. However, in order to carry out this process effectively, each of the layer elements must have a stiffness which is high enough to allow the layer to be separated from the neighboring layer element when it is constricted along the surface. Further, each layer element is required to have a high resistance against sliding along the surface of the neighboring layer element. This sliding resistance may be produced by the adhesive material for membrane sealing. The sliding resistance can be further enhanced by increasing the moisture in the layer arrangement.

FIG. 6 shows an embodiment of a second process of bulging a layer arrangement according to the present invention. This second bulging process is applied to a layer arrangement which is loosely wound about a mandrel, with the result that the loosely wound layer arrangement is changed to a tightly wound layer arrangement without any abnormal relative shifting of the layer elements and without any wrinkles in the layer elements.

Referring to FIG. 6, a loosely wound layer arrangement 1A, wound around a mandrel 2 with the forward end of the layer arrangement fixed at its corners to the mandrel, is mounted for rotation in a pinch roller apparatus comprising three rollers 17, 18 and 19. The three rollers have axes parallel to the axis of the mandrel and are located at positions which are spaced apart from each other around a circle. The axis of the loosely wound layer arrangement 1A is positioned at the central point of the circle and is subjected to pressures by the separated rollers. The apparatus is designed so that each roller is pressed radially and partially against the loosely wound layer arrangement over the entire width thereof and is forced to rotate by a rotational movement of the layer arrangement.

Figure 7:
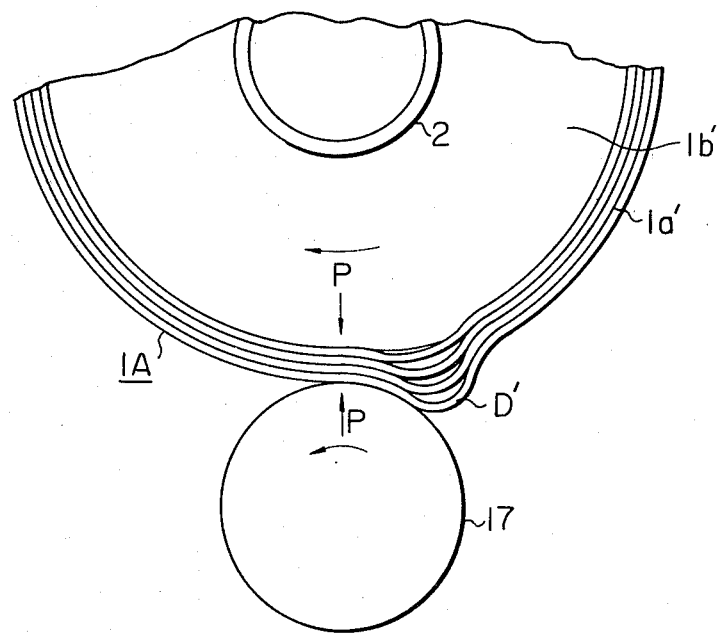
FIG. 7 is a diagrammatic enlarged partial view of FIG. 6, showing the bulged portions of the wound layer arrangement.

FIG. 7 is presented to show the bulging phenomenon of the loosely wound layer arrangement, shown in FIG. 6, which occurs while the mandrel 2 is rotated and the rollers 17, 18 and 19 are pressed against the loosely wound layer arrangement. This bulging phenomenon is substantially the same as that in the first bulging process shown in FIGS. 3, 4 and 5. As indicated in FIG. 7, the loosely wound layer arrangement 1A is tightly wound about the mandrel 2 by rotating the mandrel with the forward end of the layer arrangement fixed to the mandrel. That is, a portion $1a'$ of the layer arragement which has not yet been tightly wound is forced to bulge radially, in the vicinity of each roller, just before coming into tight contact with the mandrel 2 or with another portion $1b'$ of the layer arrangement which has been tightly wound. Consequently, at each bulged portion $D'$ the layer elements are partially separated from each other.

The degree of winding tightness of the portion $1a'$ increases radially inward at a first stage when the mandrel 2 is rotated and the rollers 17, 18 and 19 are pressed against the portion 1a'. However, at the final stage the winding tightness of every part in the portion 1a' increases up to a predetermined value, so that the portion 1a' is changed to a tightly wound layer arrangement wherein the winding tightness is uniform over the radius of the layer arrangement.

In the above-described winding process, every part of the loosely wound portion 1a' is forced to have an increased winding tightness as it passes over each roller 17, 18 or 19, compared with that before passing over said rollers. In other words, every part is forced to come into a tighter contact with the inner part of the wound layer arrangement every time it passes over each roller compared with that before passing over said rollers. The above winding is performed without any abnormal relative shifting and without the occurrence of wrinkles. This is because the layer elements of every part are bulged, so that they are partially separated from each other, just before said part passes over each roller.

Each of the three rollers appears to have two functions. One of the functions is the same function as that of the roller 16 shown in FIG. 4. That is, the layer arrangement is tensioned by the roller so that the layer arrangement is tightly wound as the mandrel is rotated. The other function is the same function as that of the pinch rollers 15 shown in FIG. 4. That is, the layer arrangement is forced to bulge by the roller in cooperation with the mandrel. In the case of FIGS. 6 and 7, the rollers 17, 18 or 19 and a portion 1b' of the layer arrangement which has been tightly wound correspond to the pair of pinch rollers 15, respectively, in FIG. 4, and; another portion 1a' of the layer arrangement which has not been tightly wound, but has been loosely wound, corresponds to the portion 1a of the layer arrangement which has not yet been wound in the case of FIG. 4. Further, the tightly wound portion 1b' of the layer arrangement in FIG. 7 also corresponds to the wound portion 1b of the layer arrangement in FIG. 4. As a result, the tightly wound portion 1b' plays the same roles as one of the rollers 15 and the wound portion 1b in FIG. 4.

The above-mentioned second bulging process of the present invention can be carried out using a single roller instead of a plurality of rollers such as those shown in FIGS. 6 and 7. However, if a single roller is applied to the circumference of the loosely wound layer arrangement, the position of the axis of the mandrel becomes unstable and the mandrel is forced to bend. As a result, the quality of the tightly wound layer arrangement is decreased compared with that in the case where a plurality of rollers are employed. Further, this bending tendency is increased when the mandrel is made of a flexible material such as a synthetic resin.

From the point of view of the quality of the tightly wound layer arrangement, the above-mentioned second bulging process is superior to the above-mentioned first bulging process. Therefore, it is preferable to adopt the following method. At a first stage, the first bulging process is applied to a layer arrangement to form a loosely wound layer arrangement, and at a second stage the second bulging process is applied to the loosely wound layer arrangement to form a tightly wound layer arrangement.

Figure 8:
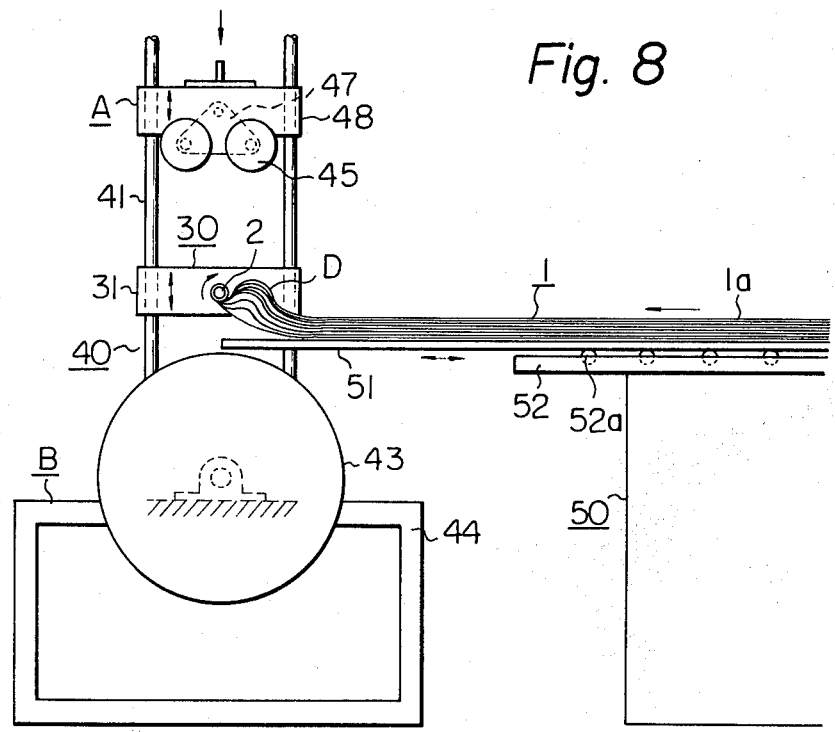
FIGS. 8 and 9 are front views of an apparatus of the present invention by which a layer arrangement is wound about a mandrel while the first and second processes of bulging the layer arrangement according to the present invention are carried out in sequence.
Figure 9:
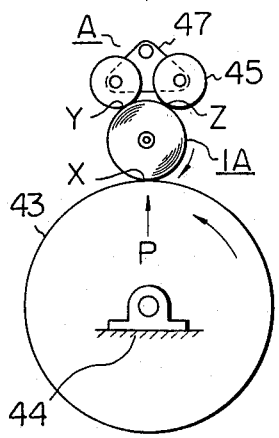

FIGS. 8 and 9 show a preferable apparatus of simple construction, by which the above-mentioned first and second bulging processes can be carried out in that order. Particularly, FIG. 8 shows the first bulging process for a layer arrangement 1 and corresponds to FIG. 5. FIG. 9 shows the second bulging process for a loosely wound layer arrangement 1 and corresponds to FIG. 6.

Referring to FIGS. 8 and 9, the apparatus comprises means 30 for rotating a mandrel 2 and means 40 for partially pressing the loosely wound layer arrangement 1A on the mandrel 2 inwardly and radially at three separated positions X, Y and Z on the circumference of the layer arrangement over the entire width of the layer arrangement. Further the apparatus comprises means 50 for supplying the layer arrangement 1 to the mandrel 2.

The mandrel rotating means 30 has a movable base 31 which is provided with a motor for rotating the mandrel 2. The movable base 31 is slidably mounted to two vertical guiding bars 41, so that the base can move upwardly and downwardly along the vertical bars. The pressing means 40 is provided with a lower roller 43 mounted on a stationary base 44 for rotation and a pair of upper rollers 45 mounted on a holder 47 for rotation. The holder 47 is fixed to a movable base 48 which is slidably mounted on the bars 41 in the same manner as the movable base 31 is mounted thereon, so that the base 48 can move upwardly and downwardly along the bars. The base 31 is disposed between the upper rollers 45 and the lower roller 43. The base 48 is connected to means for adjusting the positions of the upper rollers 45 relative to the mandrel 2, and is subjected to an external force by a pressure drive, for example, an air-cylinder, when required. The supplying means 50 has a longitudinal plate 51 and a free roller conveyer 52 providing a path for the plate 51 by means of a plurality of rollers 52a. The layer arrangement is placed on the plate 51 and is forced to move toward the mandrel together with the plate along the rollers 52a, when the mandrel is rotated with the forward end of the layer arrangement fixed to the mandrel.

The upper rollers 45, in cooperation with the movable base 48 and the air cylinder, function as means A for urging the loosely wound layer arrangement at two separated positions on the circumference of the wound layer arrangement along the entire width thereof. The lower roller 43, mounted on the stationary base 44, functions as means B for supporting or receiving the wound layer arrangement. Therefore, when the upper rollers 45 and 46 are pressed against the loosely wound layer arrangement 1A, the wound layer arrangement is pressed against the lower roller 43. As a result, the mandrel and the wound layer arrangement are prevented from being bent along the axis of the mandrel while they are pressed radially by the upper and lower rollers 45 and 43.

If the mandrel 2 is a rigid body and is mounted on a stationary base for rotation, only an urging means, such as the means A above, may be employed for performing the second bulging process. However, in general, most of the mandrels are flexible bodies of a synthetic resin. Therefore, in such case, it is necessary to employ not only the urging means, such as means A, but also supporting means, such as the means B above, in order to ensure that the mandrel and the wound layer arrangement are not bent or deformed.

Figure 10:
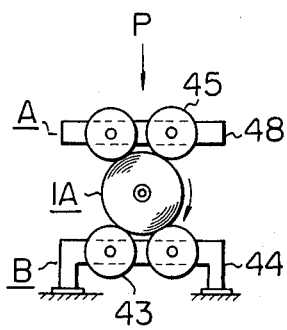
FIGS. 10 and 11 are partial front views showing other embodiments of the apparatus corresponding to that of FIG. 9, respectively.
Figure 11:
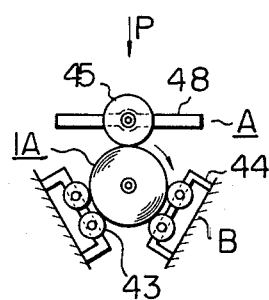

FIGS. 10 and 11 correspond to FIG. 9 and show other preferable embodiments of the apparatus for performing at least the second bulging process of the present invention. Referring to FIGS. 10 and 11, A denotes means for urging a loosely wound layer arrangement 1A, which comprises a movable base 48 and two rollers 45 mounted on the movable base for rotation. B denotes means for supporting the loosely wound layer arrangement, which means comprises a stationary base 44 and one or two rollers 43 mounted on the stationary base for rotation. The rollers 45 of the urging means A are pressed by an air-cylinder, or the like, against the loosely wound layer arrangement 1A, while the rollers 43 support the loosely wound layer arrangement 1A. In the above two embodiments, the apparatus has means provided with a moveable base for rotating the mandrel 2 provided with a movable base, such as the mandrel rotating means 30 in FIG. 8.

Figure 12:
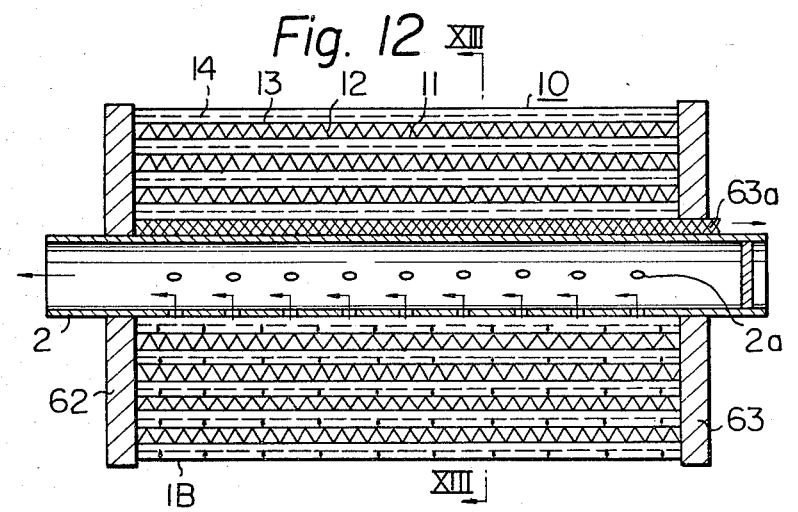
FIG. 12 is an axially sectional view of an embodiment of a liquid separation module produced by the method of the present invention.
Figure 13:
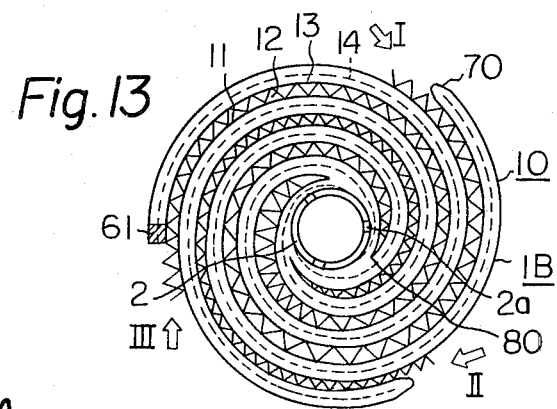
FIG. 13 is a cross-sectional view of the module taken along the line XIII—XIII of FIG. 12.

FIGS. 12 and 13 depict a liquid separation module of the type disclosed in the specification of U.S. Pat. No. 3,933,646. This module was produced with a united layer arrangement, as shown in FIG. 2, by carrying out the first and second bulging processes in the apparatus shown in FIG. 8. In this case, the first bulging process was carried out as shown in FIG. 5 or FIG. 8, while the layer arrangement was loosely wound by a hollow mandrel 2 having many holes 2a.

Referring to FIGS. 12 and 13, a sheet of semipermeable membrane 10 forms a first membrane sheet 11 and a second membrane sheet 13 in each individual layer element I, II or III. The two ends of the membrane 10, that is, the rear end of the second membrane sheet 13 in the individual layer arrangement I and the rear end of the first membrane sheet in the individual layer arrangement III are bound by a sealing material 61 to form a loop of the membrane sheet 10.

The tightly wound layer arrangement 1B has three second spacing layers for the feed solution, forming three spiral feed solution passages around the mandrel 2. These second passages are closed at their forward ends facing the mandrel 2 and are open at the rear ends along the circumference of the wound layer arrangement 1B. Further, the tightly wound layer arrangement 1B has three first spacing layers 14 for the permeated solution, forming three spiral permeated solution passages around the mandrel 2. These first passages are closed at their rear ends along the circumference of the wound layer arrangement and are open at their forward ends facing the mandrel 2. The two kinds of passages are separated from each other by the membrane sheet 10, that is, the first and second membrane sheets 11 and 13.

All of the solution passages are closed at the spiral edges of the first and second membrane sheets 11 and 13, or at the spiral edge of the membrane sheet 10, over the entire spiral length, by a sealing member 62 of rigid material; while they are closed by a sealing member 63 of rigid material at the opposite spiral edges of the sheets 11 and 13, or at the opposite spiral edge of the sheet 10, over most of the spiral length, except for a part of length in the vicinity of the mandrel surface. The permeated solution passages communicate with the interior of the mandrel through the holes 2a. The feed solution passages are partially axially open at the spiral edges of the sheets 11 and 13, or the spiral edge of the sheet 10, near the mandrel surface to allow the nonpermeated solution to flow through a path 63a. The feed solution is fed from the open ends of the feed solution passages as indicated by the arrows; the nonpermeated solution flows out from the path 63a as indicated by arrows, and; the permeated solution flows into the interior of the mandrel 2 and flows in the interior of the mandrel as indicated by arrows. The opposite side edges and opposite ends of the membrane sheet 10 were sealed by the sealing members 62 and 63 and sealing material 61, respectively, as shown in the drawings, after the united layer arrangement 1 had been tightly wound by the mandrel 2.

If a liquid separation module of the spiral type employs a single sheet of reverse osmosis membrane such as that of the module shown in FIG. 13, the problem described below occurs.

Figure 14A:
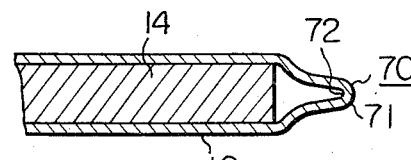
FIGS. 14A and 14B are enlarged partial cross-sectional views showing the rear end portion and the forward end portion of the specific layer elements in the layer arrangement of FIG. 2, after the layer arrangement is tightly wound about a mandrel.
Figure 14B:
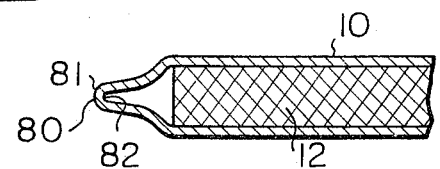

FIG. 14A is an enlarged view showing the rear closed end 70 of the permeated solution passage formed by the bent portion of the membrane sheet 10 in FIG. 13. FIG. 14B is an enlarged view showing the forward closed end 80 of the feed solution passage formed by the bent portion of the reverse osmosis membrane sheet 10 in FIG. 13. With respect to the spacing layers 14 and 12, the outer surfaces 71 and 81 of the bent portions 70 and 80 of the reverse osmosis sheet 10 are considerably elongated along the length of the sheet, compared with the inner surfaces 72 and 82 of the bent portion or the surfaces of the other portions; when the module is completed. The reverse osmosis membrane consists of a layer having a higher density i.e. a skin layer, and another layer having a lower density, i.e. a porous layer.

The outer surface 71 of the bent portion 70 is formed by the high density layer, while the outer surface 81 of the bent portion 80 is formed by the lower density layer. Therefore, the considerable elongation of the outer surface 71 causes the bent portion 70 to exert a reduced permeating function compared with the other portions, that is to allow the feed solution or the nonpermeated solution to flow into the spacing layer 14. This considerably damages the performance of the module. Contrary to this, the considerable elongation of the outer surface 81 does not cause the permeating function of the portion 80 to be reduced because the inner surface 82, which is formed by the higher density layer, is not elongated, but, in turn constricted. The above problem is solved by selecting a reverse osmosis membrane having a "percentage elongation at break" of a value high enough to prevent a considerable elongation, that is, a percentage elongation at break of not less than 5%, and preferably, 6.5%.

The percentage elongation at break is calculated by dividing the elongation at the moment of rupture of a specimen by the initial gage length of a specimen, which is the distance between the grips, and multiplying by 100. This elongation at break is measured by a standard method in accordance with JIS Designation: Z-1702, under the following conditions.

Testing machine: Tensile tester of tensilon type
Test specimens: Specimens of Danbel type No. 3
Distance between the grips: 40 mm Moisture is imparted to the specimens of the reverse osmosis membrane, so that the same condition exists as that in a liquid separation module. The specimens are then covered with thin papers while they are subjected to the test, in order to prevent evaporation of the water contained in the specimens.

The present invention may be applied to produce not only a liquid separation module of the spiral type defined in FIGS. 12 and 13, that is, defined in U.S. Pat. No. 3,933,646, but also a liquid separation module of other conventional spiral types.

What is claimed is:

1. An apparatus for producing a liquid separation module, said module having a hollow mandrel with at least one hole extending through the circumference thereof for permitting passage of permeated solution therethrough, and a spirally wound layer arrangement which, viewed in transverse cross section, comprises a plurality of semipermeable, separatory membrane sheets and spacing layers therebetween, at least one of the spacing layers having its inner end secured to said mandrel, comprising said having its inner end secured to said mandrel, comprising said mandrel, means for rotating said mandrel for loosely winding said layer arrangement on said mandrel, and roller means for radially pressing said loosely wound layer arrangement at least at one position on the circumference of said loosely wound layer arrangement over the entire width of said loosely wound layer arrangement for increasing the degree of winding tightness of said wound layer arrangement.

2. An apparatus for producing a liquid separation module as claimed in claim 1, wherein said pressing means is provided with at least one roller having an axis parallel to the axis of said mandrel and having a length over the width of said layer arrangement, said roller being capable of being pressed against said layer arrangement.

3. An apparatus for producing a liquid separation module as claimed in claim 2, wherein said pressing means comprises means for urging said layer arrangement radially inward at least at one position on the circumference of said layer arrangement over the entire width of said layer arrangement and means for supporting said layer arrangement, said urging means and said rotating means having movable bases, while said supporting means has a stationary base.

4. An apparatus for producing a liquid separation module as claimed in claim 3, wherein said urging means comprises at least one roller capable of being pressed against said layer arrangement and mounted to said movable base of said urging means for rotation, and said supporting means comprises at least one roller capable of being pressed against said layer arrangement and mounted to said stationary base of said supporting means for rotation.

5. An apparatus for producing a liquid separation module as claimed in claim 4, wherein a stationary means for guiding said movable urging means and rotating means is provided, said movable bases of said urging means and rotating means being slidably mounted to said guiding means.

6. An apparatus for producing an liquid separation module as claimed in claim 5, wherein said guiding means is mounted to said stationary base of said supporting means, said rotating means being positioned between said urging means and said supporting means.

7. An apparatus for producing a liquid separation module as claimed in claim 6, wherein a pressure drive for urging said movable base of said urging means toward said supporting means is provided, so that said roller of said urging means is pressed radially against said layer arrangement and said layer arrangement is pressed radially against said supporting means.

8. An apparatus for producing a liquid separation module as claimed in claim 7, wherein means for supplying said mandrel with a layer arrangement to be wound loosely about said mandrel is provided and said rotating means is adapted to wind said layer arrangement loosely about said mandrel while said layer arrangement is being supplied to said mandrel.

9. An apparatus for producing a liquid separation module as claimed in claim 8, wherein said pressure drive is an air cylinder and said supplying means is a free roller conveyer with a longitudinal flat plate thereon, and a portion of said layer arrangement which has not yet been wound by said mandrel is placed on said plate.

10. In a spiral-type liquid separation module for use in semipermeable membrane separation apparatus, comprising a hollow mandrel having at least one hole in its outer circumference, and a sheet layer arrangement which, viewed in transverse cross section, comprises a plurality of pairs of semipermeable membrane sheets and a plurality of first and second spacing layers forming first passages for carrying a permeated solution and second passages for carrying a feed solution, said first spacing layers being disposed between said membrane sheets and said second spacing layers being disposed between the outer surfaces of said respective membrane sheets, wherein said layer arrangement is spirally and tightly wound about said mandrel to form said first and second passages in spiral form, said first passages being closed at their respective radially outermost ends and open at their respective radially innermost ends to communicate with the interior of said mandrel through said hole, and said second passages being closed at their respective radially innermost ends and open at their respective radially outermost ends, the improvement characterized in that a single semipermeable membrane sheet having a plurality of folds extending parallel and adjacent to the axis of said mandrel is provided, wherein each of said folds forms one of said pairs of membrane sheets, and wherein the axially extending ends of said single membrane sheet are joined to form said sheet into a continuous loop, when viewed in transverse cross section, with said second spacing layers being located outside the loop and said first spacing layers and said mandrel being located inside the loop.

11. A liquid separation module as claimed in claim 10, wherein said membrane sheet is a reverse osmosis membrane having a percentage elongation at break of not less than 5%, preferably of 6.5%.

* * * * *

UNITED STATES PATENT AND TRADEMARK OFFICE
CERTIFICATE OF CORRECTION

PATENT NO. : 4,277,340

DATED : July 7, 1981

INVENTOR(S) : Naotatu Kanamaru, et al.

It is certified that error appears in the above—identified patent and that said Letters Patent is hereby corrected as shown below:

Claim 1, line 10: after "said", delete "having its inner end secured"

Claim 1, line 11: delete "to said mandrel, comprising said".

Signed and Sealed this

Twenty-second Day of September 1981

[SEAL]

Attest:

GERALD J. MOSSINGHOFF

Attesting Officer     Commissioner of Patents and Trademarks